UNITED STATES PATENT OFFICE.

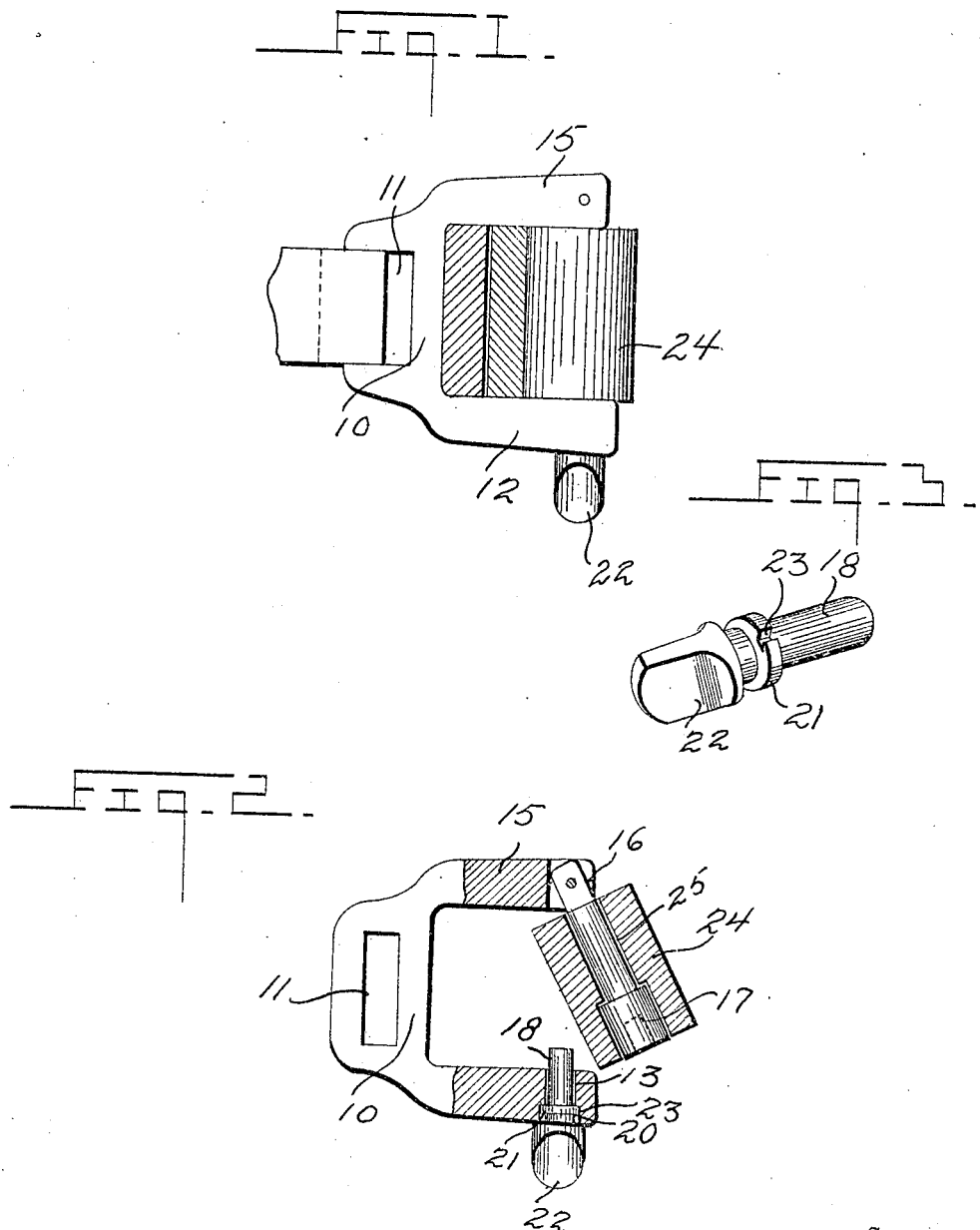

WILLIAM REUTER, OF BERLIN, NEBRASKA.

LINE-ROLLER.

943,787. Specification of Letters Patent. Patented Dec. 21, 1909.

Application filed May 11, 1909. Serial No. 495,273.

*To all whom it may concern:*

Be it known that I, WILLIAM REUTER, a citizen of the United States, residing at Berlin, in the county of Otoe and State of Nebraska, have invented certain new and useful Improvements in Line-Rollers, of which the following is a specification.

This invention relates to harness connections, and more particularly to a rein holder, constructed in such a way as to be quickly engaged or disengaged from reins.

Another object is to provide such a device which may be utilized upon different types of harness, and which may be manufactured at a very low cost.

Another object is to provide a novel method of retaining a roller guide against detachment.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side view of the device carried upon a suitable harness support and having a rein engaged therethrough, Fig. 2 is a sectional view of the device, in disengaged position, Fig. 3 is a detail view of the lock pin.

Referring to the drawings, there is shown a carrying member 10 substantially U-shaped in form, and provided with a suitable opening 11 in its bight portion adapted for engagement with a strap for supporting the device, though it will be understood that any other usual method of supporting such devices may be utilized if desired. The extremity of the arm 12 is provided with a transverse opening 13 enlarged at its outer end, its axis extending in the plane of the major portion of the device. The opposite arm 15 is bifurcated transversely in the plane of the major portion of the support, and has pivotally engaged therein the flattened portion of a trunnion member 16, the outer end portion of which is enlarged and provided with an axial socket 17 adapted to lie at times in registry with the opening 13, for the reception commonly of a pin 18 therethrough. It will be noted that the enlarged portion of the opening 13 is provided with an inwardly extending lug or tooth 20, spaced from the inner extremity of the enlarged portion. The pin is provided with a collar flange 21 spaced from the head portion 22, and having a notch 23 therein adapted to receive the lug slidably therein for engagement between the flange and the head. Thus the pin may be introduced into the opening 13 and socket 17, the notch 23 being presented over the lug 20 after which the pin may be rotated sufficiently to hold it securely engaged. Carried upon the trunnion member there is a roller 24 having a channel 25 therethrough engaged closely over the trunnion and reduced inwardly of the enlarged portion of the trunnion to retain the roller against disengagement when the trunnion is flung outwardly from the arm 12.

In using the device, after being secured upon a suitable support, in order to introduce a rein therein, the pin is disengaged by rotating it until the notch in the flange 21 is brought into registry with the lug 20, when it may be withdrawn and the roller swung out pivotally on the arm 15. It will be seen that the roller will then be held securely against disengagement and after the presentation of the rein between the arms 12 and 15 the roller may be again swung into registration with the opening 13 after which the pin may be engaged with the device as above described.

It will be seen that only four instrumentalities are involved in the construction of the device, each of which is of a simple conformation adapting them to be manufactured with simple machinery and enabling their assemblage with unskilled labor.

What is claimed is:

1. A device of the class described comprising a substantially U-shaped member provided with parallel supporting arms, a trunnion member pivoted upon the extremity of one of the arms, said trunnion member being enlarged at its outer end and provided with an axial recess opening upon its outer end, the opposite arm having a transverse perforation therein, the trunnion member being adapted to be moved between said arms with the axial recess in registration with the perforation, a roller carried upon the trunnion, and a retaining pin slidably engaged through the second named arm and the trunnion.

2. A device of the class described comprising a substantially U-shaped member, a trunnion member pivotally engaged upon one side of the U-shaped member, said trunnion member being adapted to be moved into close proximity with the opposite side of the U-shaped member, the outer end of the trunnion being enlarged and provided with an axial recess, the side of the U-shaped member opposite the trunnion being provided with a transverse passage enlarged at its outer end and provided with an inwardly projecting lug spaced from the inner extremity of the enlarged portion, a pin member slidably engaged through the passage and the axial opening, said pin member having a peripheral flange provided with a notch adapted to receive the lug therethrough for locking of the pin against casual detachment, and a roller member carried upon the trunnion, said roller having a channel therein of the same contour as that of the trunnion.

In testimony whereof I affix my signature, in presence of witnesses.

WILLIAM REUTER.

Witnesses:
 HOWARD O. DAVIS,
 S. H. BUCK,
 DAVID REUTER.